July 25, 1967  D. SILVERMAN  3,333,239
SUBSURFACE SIGNALING TECHNIQUE
Filed Dec. 16, 1965  3 Sheets-Sheet 2

DANIEL SILVERMAN
INVENTOR.

BY Paul F. Hawley

ATTORNEY.

DANIEL SILVERMAN
INVENTOR.

BY Paul F Hawley

ATTORNEY.

United States Patent Office 3,333,239
Patented July 25, 1967

3,333,239
SUBSURFACE SIGNALING TECHNIQUE
Daniel Silverman, Tulsa, Okla., assignor to Pan American Petroleum Corporation, Tulsa, Okla., a corporation of Delaware
Filed Dec. 16, 1965, Ser. No. 514,311
11 Claims. (Cl. 340—18)

ABSTRACT OF THE DISCLOSURE

In this invention, telemetering from a remote point within the earth over a path including at least a considerable portion of earth as a circuit element is accomplished, even in the presence of the inevitable high noise signal level always found when earth is such an element. A preselected suite of unique signals is made available at the transmission point within the earth. A measurement is made of some earth parameter and a selected one of the unique signals is transmitted, depending upon the measured value of the parameter. This unique signal, together with a large quantity of noise is received and the received signal is correlated with a replica of each of the suite of unique signals available at the transmitter. The resultant correlograms are compared so that the largest one can be determined, to identify which of the unique signals was sent. If desired, two or more parameter measurements may occur simultaneously and two or more unique signals may be transmitted simultaneously, being separated by the correlation process.

---

This invention pertains to the art of signaling between remote locations and has particular reference to such signaling in which the source is a considerable distance below the surface of the earth. It has special application to measuring earth parameters during drilling operations or for transmitting well conditions in offshore operations to the surface platform, vessel, or the like.

A number of techniques for such signaling have been suggested in the past. For example, in the art of logging while drilling it has been proposed to measure, by well-known techniques, one or more earth parameters such as electrical resistance, rock hardness or density, pressure, drill mud condition, etc., and transmit it to the surface during the course of the drilling operations. A signal proportional to the parameter measured may be sent to the surface through a segmented connected cable, one segment being located in each joint of the drill pipe employed, there being some system of either conductive or reactive coupling at the joints. This system is extremely expensive and is subject to high attenuation at the joints and possibility of interference, as drilling fluid can penetrate the coupling. Signals can be transmitted using a coil inductively coupling a metal drill pipe so that the drill pipe furnishes part of a conductive loop which includes the earth. Current passes from the vicinity of the drill bit to the top of the drill pipe through the earth and can be picked up conductively and reactively at or near the surface for suitable amplification and observation, or recording. See, for example, Patents 2,354,887 and 2,370,818. This system works well at moderate depths but at greater depths, it suffers from the high electrical noise present in the earth, which becomes an increasing factor as the signal is attenuated by greater depth. Even though extremely low signal frequencies be employed, for example of the order of a cycle per second, the signal-to-noise ratio may still be inadequate.

It has also been suggested that pressure pulses or other mechanical vibrations be produced proportional to a quantity or coded in accordance with the quantity. These signals are transmitted through the mud column to the surface where pressure transducers, in turn, produce a signal which may be amplified, observed, and/or recorded. See, for example, the Alder Patent 2,901,685, the Arps Patent 3,115,942, and similar systems. Here, again, as the depth from which the signal must be transmitted increases, the signal becomes more and more attenuated and noise renders the signal unintelligible.

I have found a data transmission system which better discriminates between the signal and the noise. This system increases the maximum range for transmission of such subsurface signals, whether electrical or mechanical. In this system a parameter is metered at the subsurface location, which may be the bottom of a well, a subsurface battery or wellhead, a submarine, etc. The metered parameter is compared with a plurality of values within an already predetermined range to determine its relative value. A predetermined coded unique signal is chosen, depending upon this relative value. This coded signal is then transmitted along a circuit from the transmitter location to a receiver which may be at or near the surface of the earth. This circuit may be a mechanical circuit such as a column of water or the like, a portion of the rock column in the earth or equivalent, or can be an electric conductor which again may be entirely or partly formed by the materials in the earth's crust. At least part of this circuit is through subsurface fluid. The signal in the presence of its attendant noise is received, preferably amplified, and then individually correlated with each of a plurality of pre-selected code signals which are replicas of the coded signals available for transmission. The outputs from the various correlations are compared, from which the coded signal having the greatest correlation with the received signal is determined. This identifies which of the repertoire of coded signals had been sent by the transmitter. Ordinarily, but not necessarily, another parameter is recorded at the same time, for example, the depth of the drill bit (if a drilling well is being logged), the time of the reception of the signal, or the like. This latter measurement is useful in correlating the measured parameter with depth, time, etc., and thus increases the amount of information available about the subsurface measurement. The process can be repeated as frequently as desired.

The main virtue of this system is the high discrimination against noise available using this technique. Of course, it would not be possible to obtain this high correlation coefficient unless the system had been previously programmed so that there was correspondence between the signals available for transmission at the subsurface locations and the replica signals available at the surface for correlation against the received signal.

This system will be described in further detail in connection with the attached figures, which form a part of this specification and are to be read in conjunction therewith. In the various figures, the same reference numeral refers to the same or a corresponding part.

Figure 1:
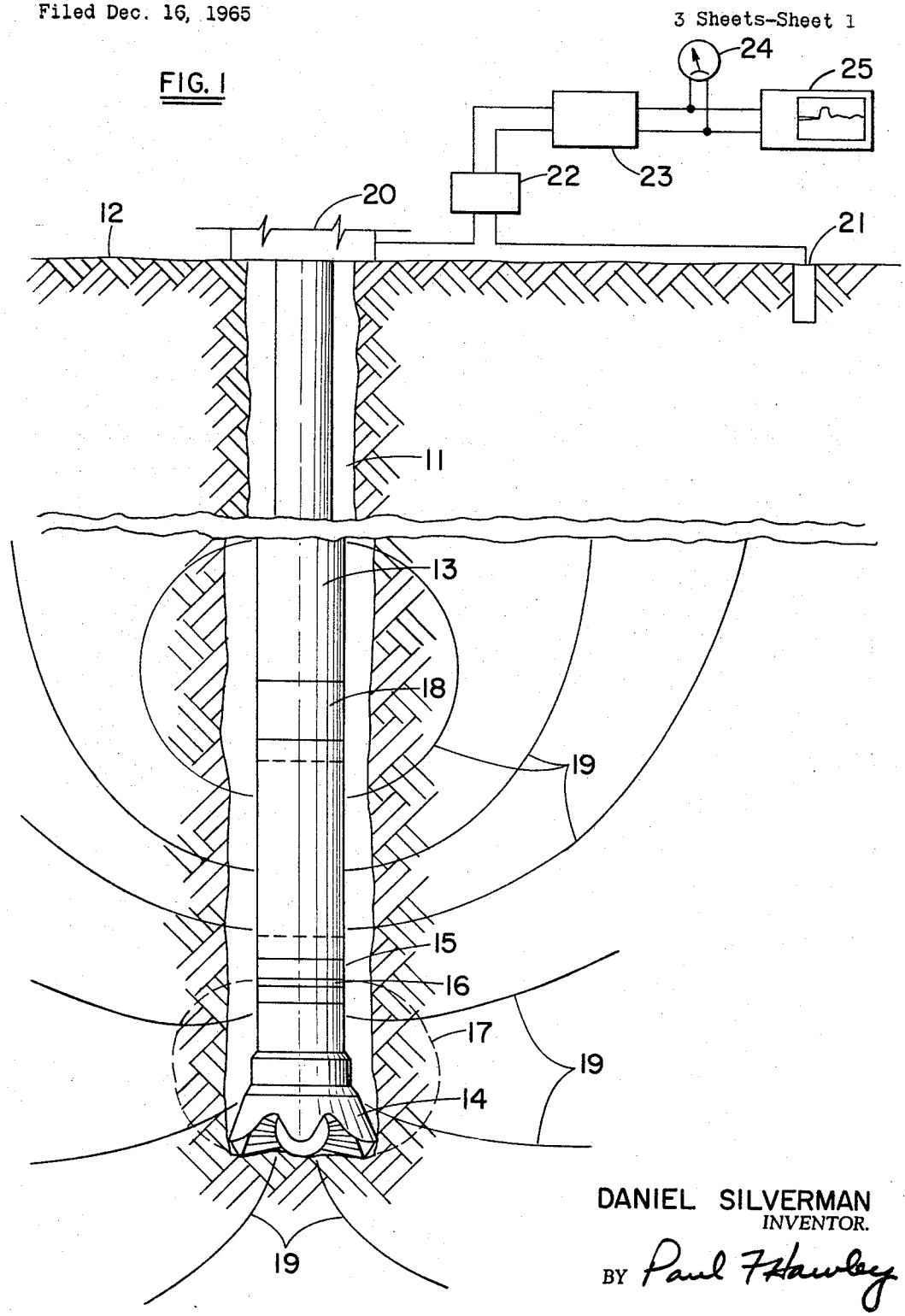
FIGURE 1 represents, in diagrammatic form, a cross section of the earth penetrated by a well, illustrating one embodiment of this invention.

In FIGURE 1 a well 11 has been drilled from the surface of the earth 12 by use of a drill string 13 at the lower end of which is attached a drill bit 14. Suitable apparatus (not shown) is employed to rotate the drill string 13 and to circulate a drilling fluid through the drill string to remove drill cuttings, all as well known in the art. The transmission apparatus sending a coded signal to the surface is hermetically sealed within the walls of the drill collars above bit 14, forming part of drill string 13.

Figure 2:
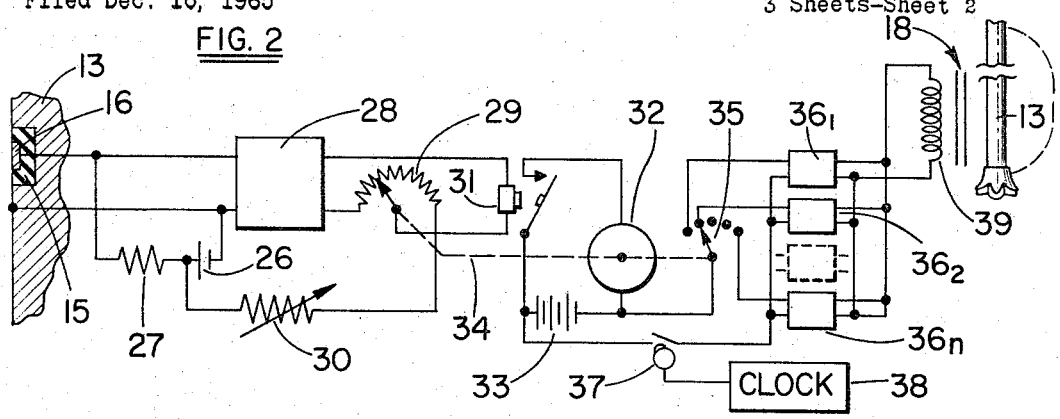
FIGURE 2 is a diagrammatic representation of subsurface apparatus used in the embodiment of the invention shown in FIGURE 1.

In this embodiment it is assumed that the resistivity of the earth formations adjacent drill bit 14 is being logged. Suitable modification for adapting this transmission system to the handling of other parameters will be apparent. Here a band of electrical insulation 15 is inlaid into the drill collar near the bit 14. An electrode 16, preferably in the form of a metal ring mounted in an insulated fashion on insulator 15, is connected to a source of potential as shown in FIGURE 2. This source of potential causes flow of electricity into the formations adjacent drilling bit 14, one path of current flow being shown by dotted lines 17. The apparatus, accordingly, produces a voltage drop between electrode 16 and the drill string 13 which is proportional primarily to the electrical resistance of the formations adjacent the bit 14. The voltage between electrode 16 and the drill string 13 is compared with a range of voltages generated in the apparatus within the drill collar. This comparison serves to energize one of a number of preselected coded signal generators. An energized coded signal generator periodically puts out a coded signal into a toroidal transformer 18 and induces flow of a transmitting signal current through the drill string and fluid-carrying paths in the earth such as paths 19. This, in turn, produces a radial drop in potential at the surface of the earth 12, which can be picked up, for example, between any part of the drilling apparatus 20 and a current electrode 21 buried at some distance, preferably of the order of hundreds of feet from the well. This voltage, in turn, is amplified by an amplifier 22 and the amplified signal (together with the amplified electrical noise) is fed to a correlator 23. This correlator, as will be described in detail later, correlates the input signal from amplifier 22 with each of a plurality of signals corresponding to the repertoire of coded signals in the subsurface apparatus to produce a correlation output which can be observed on a meter 24, or which can preferably be recorded on a strip chart recorder 25, or the like.

FIGURE 2 shows one arrangement of subsurface apparatus which can be sealed within an opening in the drill collar. Here a source of potential 26 applies a potential in series across resistor 27 and the combination of the electrode 16 and the drill string 13. This produces a drop of potential across the input to an amplifier 28 which can, accordingly, produce an amplified output proportional to the formation resistance adjacent the bit 14. If resistance 27 is at least ten times the resistance between electrode 16 and the drill string 13, the electrode current is substantially constant and the drop of potential on the input to amplifier 28 is directly related to this formation resistance. Source 26 also produces a voltage drop across a self-balancing potentiometer 29 through an adjusting resistor 30. This potentiometer voltage thus incorporates a range of values including that value representing the output from amplifier 28. The output of amplifier 28 is bucked against the output of potentiometer 29 and the difference is applied across the coil of a relay 31. This, in turn, drives a small reversible motor 32 supplied with a voltage source 33, to adjust the setting of the movable arm of potentiometer 29 through a shaft represented by the dotted line 34. (The connection and relay arrangement is shown only in diagrammatic form, self-balancing potentiometers being well known.) The motor 32, accordingly, adjusts the arcuate position of the recorder arm so that this position is directly proportional to the measured parameter. Simultaneously this motor rotates the blade of a rotary switch 35 which has a plurality of contacts corresponding in arcuate position to the possible movement of the arm of the potentiometer 29. Each of these contacts is connected to one only of a preselected plurality of coded signal generators $36_1$ . . . $36_n$. The other side of the input to each of these generators is completed through a switch 37 to the potential source 33. Switch 37 is cam actuated and driven by some cyclic apparatus such as clock 38 so that the switch periodically closes and opens. This same clock 38 is also connected to the signal generators $36_1$ . . . $36_n$ so that each time switch 37 closes, a pre-selected coded signal is emitted from one of the signal generators, as determined by the arcuate position of the switch blade of switch 35. Since only one coded signal generator operates at a time, it is simple to connect all of the outputs of these signal generators across the primary 39 of the toroidal transformer 18, the secondary of which is the drill string 13 and the earth return paths.

The arrangement of the coded signal generators $36_1$ . . . $36_n$ is shown in more detail in FIGURE 3. The source 33 is connected through the blade of switch 35 to the contacts one each of which goes to a contact $40_1$ . . . $40_n$ of a cam switch $41_1$ . . . $41_n$. A slip ring and brush arrangement $42_1$ . . . $42_n$, in turn, connects the center part of all these cam switches $41_1$ . . . $41_n$ to the primary 39 of the toroidal transformer 18, the circuit being completed back to the source 33. The clock 38 drives all of the cam switches $41_1$ . . . $41_n$ simultaneously, and is connected to these cams so that when switch 37 is closed these cams complete one revolution before switch 37 again opens.

Figure 3:
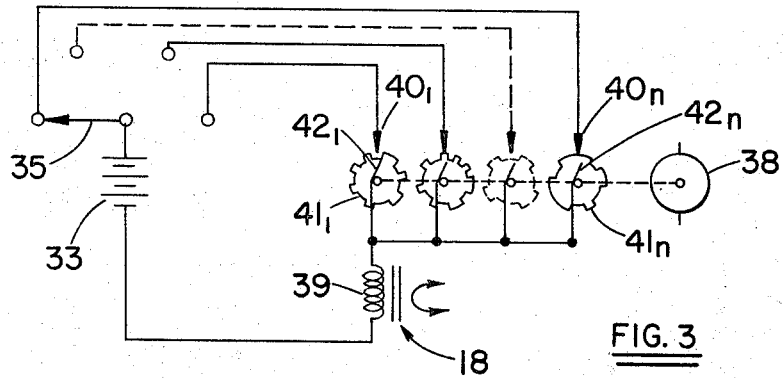
FIGURE 3 is a further detail of some of the apparatus from FIGURE 2.

Each cam switch is arranged with a different contact pattern so that the various electric signals produced in the primary 39 of toroidal transformer 18 are each unique compared with the others. This may be as shown in FIGURE 3 by making the contacts of different arcuate dimensions and with different separation between the cam teeth, or in any other fashion to insure that the time pattern of the voltage applied to primary 39 for each such signal is markedly different from that of all others.

Figure 4:
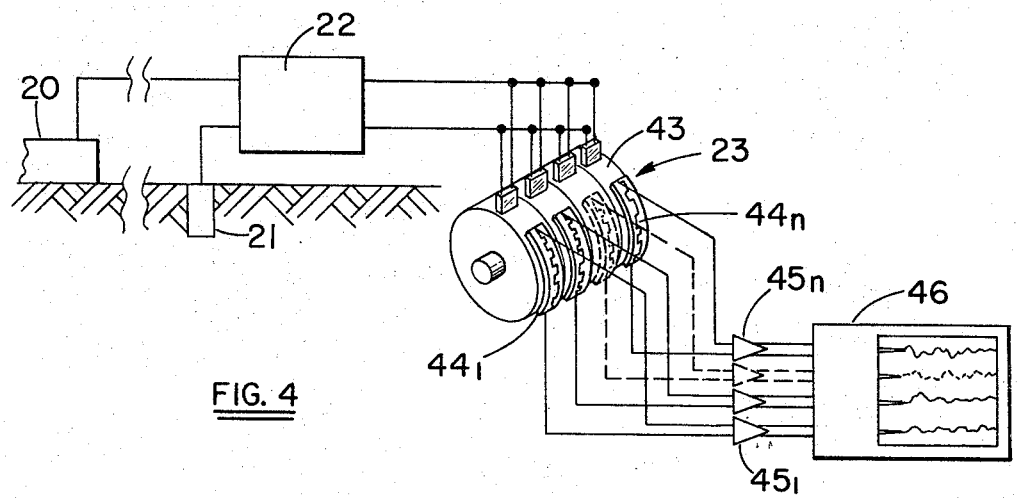
FIGURE 4 shows a surface apparatus useful in correlation as carried out in this invention.

FIGURE 4 shows a preferred form of apparatus in diagrammatic form used at the surface to receive the coded signals and to correlate these signals. The signal generated between electrodes 20 and 21, together with the attendant electrical noise is amplified by amplifier 22 and fed to the correlator 23. In such a correlator, an output is produced proportional to $$E(t)=k\int_{T_1}^{T_2}E_1(t)E_2(t+\tau)dt \quad (1)$$

where $E_1(t)$ is the signal from amplifier 22, $E_2(t)$ is a signal which varies in time or space in accordance with the output of one of the signal generators $36_1$ . . . $36_n$. In FIGURE 4, we have shown a type of correlator illustrated in U.S. Patent 3,174,142 Mallinckrodt. In very diagrammatic form, the output from amplifier 22 is magnetically recorded as a plurality of magnetic tracks on a recording drum 43. These tracks, equal in number to the number of signal generators $36_1$ . . . $36_n$, pass beneath a corresponding plurality of curved elongated pick-up heads $44_1$ . . . $44_n$, each one of which has a conductive path which is a replica in shape to the amplitude-time variation of the signal from one of the signal cams $41_1$ . . . $41_n$. Magnetic recording drum 43 is revolved at constant speed by a source (not shown) and the recorded magnetic signal from the various tracks is correlated with the signal etched on the corresponding pick-up head $44_1$ . . . $44_n$. The output of the pick-up head $44_1$ . . . $44_n$ is preferably amplified by a plurality of identical amplifiers $45_1$ . . . $45_n$. The correlated output is then recorded or observed, for example on the multiple recorder 46, or one channel at a time can be observed by meter 24 or recorded on a single strip recorder 25, as shown in FIGURE 1.

When a plurality of correlations is made between the received signal and each of a plurality of coded preselected signals which are replicas of the coded signals available from the subsurface transmitter, the correlation coefficient of the one of the plurality of signals which matches the transmitted signal will be much higher than that of any of the others. Numerous tests have already shown that correlation between a received signal in the presence of large amounts of noise and a signal having the pattern or replica of the sent signal gives a very high signal-to-noise ratio filter, which is precisely what is required in the subsurface telemetering system.

It is seen that the essentials of this signaling system are relatively few. It is necessary to provide a transmission system which can periodically emit a unique coded signal selected from a repertoire of such signals, the selection being made in accordance with the value of a measured subsurface parameter within a pre-selected range of such value. Secondly, there must be a surface system for receiving the transmitted coded signal and for correlating such signal against each of the patterns in the repertoire to permit the determination of which unique coded signal was being received. It is apparent that while this system responds to a parameter metering system, on the other hand, this system does not depend upon any particular such measuring system and, accordingly, may be employed with any such system. In fact, if the repertoire of unique coded signals in the transmitter station (and the equivalent in the surface correlation system) be increased, it is possible to measure two or more parameters and separately telemeter these to the surface. In other words, a combination of different specific signals or combinations of signals can be sent simultaneously or in time pattern as long as the corresponding coded equivalent signal is available at the surface for correlation. This permits a large number of separate values or pieces of data to be transmitted.

The outstanding virtue of this system is that the operator is not trying to determine at a location remote from the transmitter the value of a particular telemetered quantity, but is simply trying to ascertain by a correlation, or matching technique, the one value which must have been sent by the transmitter. This is, of course, responsible for the ability of this system to transmit data in the presence of much higher noise levels than were previously possible.

The system has been thus far described in connection with the production of a well log during drilling or immediately following drilling. However, it is apparent that it is useful in a wide variety of applications and for signaling information from sources other than in wells. Thus, in offshore well completion it is important to know that at the surface certain wellhead information such as tubing pressure, annulus pressure, condition of flow, and whether certain specific valves are opened or closed, etc. It is already known on land to produce a unique parameter for each such condition or fraction of a total pressure range, etc. Each such condition in the subsurface system can be sent automatically to a transmission system of the sort shown in FIGURES 2, 3, and 4, the measured parameter being thereby transmitted as a unique coded signal through the water for reception at or near the water surface and correlated to determine which signal was being sent at that particular time. This gives control information to the operator who can thereafter use any appropriate system for varying the wellhead parameters as desired. Such signals from one, or a battery of wells scattered over a large area, can be picked up at a central data collecting system at a considerable distance from the individual wells, for example.

Figure 5:
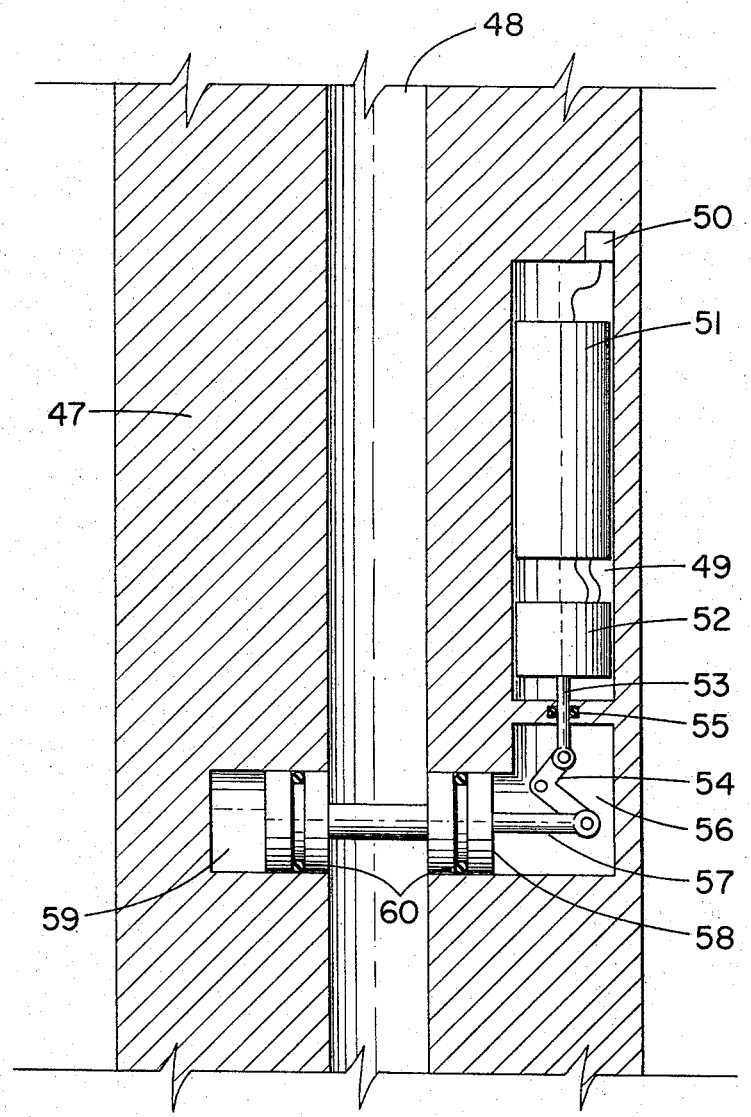
FIGURE 5 shows, in diagrammatic form, certain apparatus illustrating a second embodiment of this invention.

It must further be understood that the transmission system which conveys the signal from transmitter to receiver need not be electrical in nature, for example as shown in FIGURES 2 to 4. Several arrangements have already been commercialized in which information about a subsurface condition is transmitted in form of a change of pressure through a drilling mud column in a well. It is not difficult to adapt my invention to such a system. One such arrangement is shown in part in FIGURE 5. Here is shown, in cross section, part of the drill collar 47 in a drill string. Drilling fluid under pressure is circulated through the bore 48 of this collar. A cavity 49 is machined in one side wall of the drill collar 47 in which one places the transmitting system. In this case, it is assumed that the parameter of interest is temperature. The temperature is metered by a thermocouple 50 suitably mounted in the drill collar 47. The output of this device is fed into apparatus collectively shown by reference numeral 51. This apparatus suitable may contain nearly all the elements shown in FIGURE 2. Thus, for example, this electric temperature-sensitive signal may be amplified by an amplifier 28 and balanced against a potentiometer 29 to position the blade of a multi-position switch 35 according to the measured range of temperature at any particular time. In turn, the multi-position switch energizes one signal generator $36_1$ . . . $36_n$ periodically, so that a unique signal out of the repertoire of signals available from $36_1$ . . . $36_n$ can be transmitted.

This signal is applied to a solenoid 52 mounted in cavity 49. The armature 53 of this solenoid mechanically transmits a signal equivalent to the electric coded unique signal to bell crank 54 through an O-ring seal 55. This bell crank 54 is mounted in an adjacent chamber 56 in the drill collar 47. It is suitably attached to the connecting rod 57 of a balanced piston 58 mounted in a bore 59 transverse of the bore 48 through the drill collar. This piston, which preferably is mounted with O-ring seals 60 in bore 59 has a central portion of reduced diameter, while the main bore and, therefore, the ends of the piston 58 are preferably at least as large as the bore 48. Accordingly, when armature 53 moves piston 58, a constriction is set up in bore 48 which automatically raises the pressure upstream in the mud flow line and lowers it in the drilling fluid circulation path below piston 58. By means of a pressure transducer mounted preferably in the drill return line near the surface of the earth, each pressure change due to action of the solenoid 52 changing the position of piston 58, is, therefore, ultimately transmitted via the mud circulation path as a pressure variation affecting the electric output of the pressure transducer. This electric output is, therefore, equivalent to the signal picked up at the input of amplifier 22 in FIGURE 4 and is amplified and correlated as described in connection with that figure.

Still other means of transmitting the selected, coded signal will be apparent to those skilled in this art. Thus, one can transmit pulses through the drill string or through a pipe (in the case of subsurface wellhead installations or the like) by causing a system of the type shown in FIGURE 5 to cause the solenoid to hammer on the pipe, mounting a seismic detector, such as a geophone, at a remote position on the pipe to pick up the selected, coded signal for correlation.

A few general words about the system may assist in its application. The greater the number of cycles or pulses involved in the signal system, the better the correlation coefficient and, therefore, it is preferable to employ for the selected, coded signals a pattern which is long in duration. If, for example, the individual signals making up the pulse were out of the order of one second duration, it is desirable to employ of the order of 10 to 50 such pulses, spaced typically at irregular time intervals, so that the total duration of one coded set of signals may involve well over a minute to transmit. If signal pulses are employed which are considerably shorter in time, obviously the overall signal duration is commensurately shorter. I do not mean to indicate that 50 is a maximum number of variations to use in one unique signal. A hundred or more can be advantageously employed if the noise level is quite high.

For signaling electrically, using the earth as part of the transmitting path, I preferably employ quite low frequencies, say of the order of a tenth cycle per second up to five cycles per second. For signaling through a mud column one might increase the frequency of the individual signals, for example, of the order of 10 to 20 cycles. Again, when using traveling seismic waves through conduits, one might approach a hundred cycles per second on the individual signals.

Considerable information is available currently on the use of the so-called Vibroseis system which also employs correlation. One type of coded signal which has been found advantageous there, and which works well in my invention, is a signal of substantially constant amplitude but varying frequency. Thus, I may employ a so-called swept frequency signal in which one unique coded signal would involve a frequency range from 1 to 10 cycles per second, a second coded signal could vary from 2 to 10 cycles per second, a third from 3 to 10 cycles per second, a fourth from 3 to 8 cycles per second, etc. This series can also include frequency sweeps in the reverse direction, from 10 to 1 cycles per second, 10 to 2 cycles per second, etc. These sweeps would preferably be of equal time length, say of the order of 30 to 60 seconds or so. In this case, a small drum magnetic recorder could correlate the input received signal against, say, 10 coded signals each consisting of one of the unique swept frequency signals mentioned above. It is possible to transmit, simultaneously, an "up sweep" signal with a "down sweep" signal in which case one gets 35 possible unique signals out of 10 primary sweeps.

It will be clear also that the received signal can be phonographically recorded for later playback and correlation.

In any case, it is very desirable in the design of a system in accordance with my invention to choose signals which have a maximum autocorrelation coefficient and a minimum correlation coefficient when correlated against any other in the set of signals. I prefer to use a ratio of such coefficients of at least 5:1.

It is apparent that it is not possible to set out all of the modifications which can be employed using this signalling system. It is to be understood that the invention is not limited to the embodiments shown or discussed, but only by the appended claims.

I claim:
1. A process for telemetering parameter data over a noisy transmission path from a single transmitting point in the earth to a single receiving point, comprising:
   measuring a parameter within a preselected range of values to determine the measured value,
   comparing this measured value with a plurality of specified values within said range to determine that one of said plurality of specified values corresponds most closely with said measured value,
   selecting one of a preselected plurality of unique source signals corresponding in number to said plurality of specified values, said selected one of said source signals being uniquely related to said one of said plurality of specified values,
   transmitting said selected source signal over said path,
   receiving said transmitted signal,
   correlating the received signal individually with a replica of each of said plurality of unique source signals,
   producing an output indication of each such plurality of correlation, and
   determining which of said plurality of said correlation outputs is the largest,
   whereby it is determined which of said plurality of unique source signals was transmitted over said path.

2. A process in accordance with claim 1 in which at least a part of said transmission path is through a body of water below the surface of the earth.

3. A process in accordance with claim 2 in which said transmitted signal is sent more than once and in which said correlation output indication is recorded.

4. The process as in claim 1 in which more than one of said plurality of unique signals are transmitted simultaneously, forming a single composite received signal.

5. The method of signaling through the earth comprising preparing a plurality of unique source signals, preparing replicas of each of said unique source signals, transmitting through the earth from a single transmitting point in the earth to a receiving point one of said unique source signals, receiving said signal at said receiving point, and correlating said received signal with each of said replicas to determine which of said plurality of unique source signals was transmitted from said single transmitting point in the earth.

6. The method of claim 5 including the additional steps of transmitting simultaneously with said one of said signals at least one other of said signals, and receiving a composite signal comprising the sum of said transmitted signals.

7. Apparatus for signaling through the earth comprising means for generating a plurality of unique source signals adapted to be transmitted through the earth, means for selecting one of said plurality of unique source signals and transmitting same through the earth from a known selected point in the earth; means for receiving said transmitted unique source signal, means to generate a replica of each of said plurality of unique source signals, and means to determine which of said multiplicity of unique source signals was transmitted from said point.

8. Apparatus in accordance with claim 7 including means to simultaneously transmit at least one additional unique signal.

9. Apparatus in accordance with claim 7 including means to record individually the results of said correlations.

10. Apparatus as in claim 7 in which said correlation means comprises a magnetically recorded signal coacting with a preformed conducting linear replica.

11. Apparatus as in claim 7 in which said means to determine which of said multiplicity of unique source signals was transmitted comprises means for correlating said received signal with each of said replicas to form a multiplicity of correlation coefficients and means to determine which of said correlation coefficients is the largest.

References Cited

UNITED STATES PATENTS

| | | | |
|---|---|---|---|
| 2,436,563 | 2/1948 | Frosch | 340—18 X |
| 2,544,569 | 3/1951 | Silverman | 340—18 X |
| 2,573,137 | 10/1951 | Greer | 340—18 X |
| 2,866,899 | 12/1958 | Busignies et al. | 324—77 |
| 3,150,321 | 9/1964 | Summers. | |
| 3,271,732 | 9/1966 | Anstey et al. | 340—15.5 |
| 3,276,015 | 9/1966 | Lerwill et al. | 343—100.7 X |

BENJAMIN A. BORCHELT, *Primary Examiner.*

SAMUEL FEINBERG, *Examiner.*

R. M. SKOLNIK, *Assistant Examiner.*